US009382825B2

(12) United States Patent
Pursifull

(10) Patent No.: US 9,382,825 B2
(45) Date of Patent: Jul. 5, 2016

(54) SYSTEM AND METHOD FOR GAS PURGE CONTROL

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 13/870,304

(22) Filed: Apr. 25, 2013

(65) Prior Publication Data

US 2014/0318514 A1    Oct. 30, 2014

(51) Int. Cl.
*F01M 13/02* (2006.01)
*F02M 25/07* (2006.01)
*F02M 25/08* (2006.01)
(Continued)

(52) U.S. Cl.
CPC ............ *F01M 13/022* (2013.01); *F02B 37/127* (2013.01); *F02D 41/003* (2013.01); *F02D 41/005* (2013.01); *F02D 41/0007* (2013.01); *F02M 25/0712* (2013.01); *F02M 25/08* (2013.01); *F02M 25/089* (2013.01); *F01M 2013/027* (2013.01); *F02D 41/0042* (2013.01); *F02D 2250/41* (2013.01);
(Continued)

(58) Field of Classification Search
CPC .......... F01M 13/022; F01M 2013/027; F01M 2013/0005–2013/0494; F01M 13/00–13/06; F02M 25/0712; F02M 25/0774; F02M 25/0776; F02M 25/08; F02M 2025/0759; F02M 2025/076; F02M 3/09; F02M 26/09; F02M 26/55; F02M 26/56; F02M 2026/002; F02M 2026/0025

USPC .............. 123/516, 517, 518, 519, 520, 559.1, 123/568.29, 572, 574, 41.86
See application file for complete search history.

(56) References Cited

U.S. PATENT DOCUMENTS 3,314,665 A * 4/1967 Tutch ............................ 261/160
7,762,060 B2 * 7/2010 Easley, Jr. ............... F01N 3/025
60/274

(Continued)

FOREIGN PATENT DOCUMENTS

WO    2009047249 A2    4/2009

OTHER PUBLICATIONS

Ulrey, Jospeh Norman, et al., "Method and System for Fuel Vapor Management," U.S. Appl. No. 13/660,884, filed Oct. 25, 2012, 35 pages.

(Continued)

*Primary Examiner* — Lindsay Low
*Assistant Examiner* — Robert Werner
(74) *Attorney, Agent, or Firm* — Julia Voutyras; Alleman Hall McCoy Russell & Tuttle LLP

(57) ABSTRACT

Systems and methods for providing vacuum to one or more of a crankcase ventilation system, an emission control system, and an exhaust gas recirculation (EGR) system included in a turbocharged engine system are provided. In one example, approach, a method includes drawing vacuum from a vacuum source located in an intake of the engine downstream of a pre-compressor throttle and upstream of an intake throttle, and applying the drawn vacuum to a discharge outlet of a uni-directional crankcase ventilation system, where an inlet of the crankcase ventilation system is coupled to the intake of the engine upstream of the pre-compressor throttle.

17 Claims, 5 Drawing Sheets

(51) Int. Cl.
*F02D 41/00* (2006.01)
*F02B 37/12* (2006.01)

(52) U.S. Cl.
CPC .............. *F02M 26/07* (2016.02); *Y02T 10/144* (2013.01); *Y02T 10/47* (2013.01)

(56) References Cited

U.S. PATENT DOCUMENTS

| | | | | |
|---|---|---|---|---|
| 7,848,870 | B2* | 12/2010 | Hirooka | B60T 17/02 123/445 |
| 7,958,871 | B2* | 6/2011 | Koenigsegg | F02B 33/40 123/559.1 |
| 8,109,259 | B2* | 2/2012 | Ulrey | F02M 25/089 123/519 |
| 8,161,746 | B2* | 4/2012 | Ulrey | F02D 41/0007 123/559.1 |
| 8,347,613 | B2* | 1/2013 | Van Nieuwstadt | F01N 3/0238 60/278 |
| 8,353,276 | B2* | 1/2013 | Lewis | F02M 25/06 123/572 |
| 8,439,022 | B2* | 5/2013 | Ruppel | F01M 13/022 123/572 |
| 2004/0182363 | A1* | 9/2004 | Suzuki | B60T 13/46 123/339.11 |
| 2009/0090337 | A1* | 4/2009 | Asanuma | F01M 13/022 123/574 |
| 2010/0300413 | A1* | 12/2010 | Ulrey | F02D 9/12 123/518 |
| 2012/0016566 | A1* | 1/2012 | Cunningham | F02D 37/02 701/103 |

OTHER PUBLICATIONS

Pursifull, Ross Dykstra, et al., "Brake Booster Fault Diagnostics," U.S. Appl. No. 13/679,503, filed Nov. 16, 2012, 39 pages.
Pursifull, Ross Dykstra, "Method and System for Vacuum Generation," U.S. Appl. No. 61/737,004, filed Dec. 13, 2012, 43 pages.
Kragh, Niels C., et al., "System and Method for Gas Purge Control," U.S. Appl. No. 13/852,785, filed Mar. 28, 2013, 29 pages.
Anonymous, "An EVAP Purge Method for GTDI Engines," IPCOM No. 000233166, Published Nov. 27, 2013, 2 pages.

* cited by examiner

SYSTEM AND METHOD FOR GAS PURGE CONTROL

BACKGROUND AND SUMMARY

Engines may direct a variety of gas streams to an intake system such as an evaporative emissions system, exhaust gas recirculation (EGR) system, and/or crankcase ventilation system. A vacuum generated in the intake system may be used to drive gas circulation through the aforementioned systems. Valves may be employed on the aforementioned systems to control the amount of gas entering the intake system.

In some approaches, vacuum used to drive gas circulation through the aforementioned systems may be based on engine intake manifold vacuum. For example, a crankcase ventilation system may pull a gas flow rate from the crankcase to positively ventilate the crankcase by relying on intake manifold vacuum. As another example, vacuum generated in the intake manifold may be used to purge fuel vapor stored in a fuel vapor canister in an evaporative emissions system by actuating a purge flow control valve.

In such approaches, the flow rate of the gas streams delivered to the engine may be a function of intake manifold vacuum so that the amount of vacuum available to the aforementioned systems may change in response to engine operating conditions. For example, during high intake flow conditions in the engine, the amount of vacuum in the intake manifold may decrease so that a reduced amount of flow occurs in one or more of a crankcase ventilation system, a fuel vapor purge system, and an EGR system. In particular, as an intake throttle is opened to a greater extent the manifold vacuum may diminish and thus may result in a stale air system in a crankcase ventilation system. As another example, the amount of purge flow may decrease during conditions where the engine can consume a higher amount of fuel vapor, e.g., during high engine intake flow conditions. In particular, at a constant engine speed, as the air flow rate increases, the vacuum pulling the purge vapor into the engine decreases during conditions when a higher purge flow rate may be desired.

Further, in some approaches, in order to decrease emissions and increase output engines may be operated with an intake volume downstream of a throttle approaching barometric pressure. In engine applications that operate with low vacuum air induction, or near atmospheric pressure (as measured post throttle body in the engine's intake manifold), the small amount of vacuum may not be enough to drive gas purging from the aforementioned systems (e.g., EGR systems, evaporative emissions systems, and/or crankcase ventilation systems). More particularly, in hybrid electric vehicle (HEV) applications, the engine run time may be shorter than the amount of time it takes to purge gas from the aforementioned systems with a low vacuum, such as from a fuel vapor canister.

The inventor herein has recognized the above-described disadvantages and, in one example approach, provides a method for a turbocharged engine comprising drawing vacuum from a vacuum source located in an intake of the engine downstream of a pre-compressor throttle and upstream of an intake throttle, and applying the drawn vacuum to a discharge outlet of a uni-directional crankcase ventilation system, where an inlet of the crankcase ventilation system is coupled to the intake of the engine upstream of the pre-compressor throttle. In some examples, the method may further comprise, in response to a fuel vapor purging event, applying the drawn vacuum to purge fuel vapors from a fuel vapor canister to an intake manifold of the engine and applying the drawn vacuum to an exhaust gas recirculation conduit to draw engine exhaust gas into an intake manifold of the engine.

In this way, gas delivery rates from crankcase ventilation systems, emission control systems, and EGR systems may be delivered in proportion to engine air flow rate during different engine operating conditions. For example, an amount of crankcase ventilation flow and an amount of fuel vapor purge flow may increase during high engine intake flow conditions when an increase in flow in such systems is desired. Such an approach may further provide a consistent uni-directional flow through a crankcase ventilation system this enabling positive crankcase ventilation under all conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description relates to systems and methods for providing vacuum to one or more of a crankcase ventilation system, an emission control system, and an exhaust gas recirculation (EGR) system included in an engine system, e.g., the engine systems shown in FIGS. 1-4. As shown in FIGS. 1-4, a vacuum source, e.g., an ejector or venturi, may be included in an intake of an engine downstream of a pre-compressor throttle and upstream of an intake throttle and may be used to provide vacuum proportional to a flow rate of engine intake air. As shown in FIG. 5, vacuum generated by the vacuum source in the engine intake may be used to drive consistent flow through a crankcase ventilation system, an emission control system, and an exhaust gas recirculation (EGR) system included in an engine system.

Figure 1:
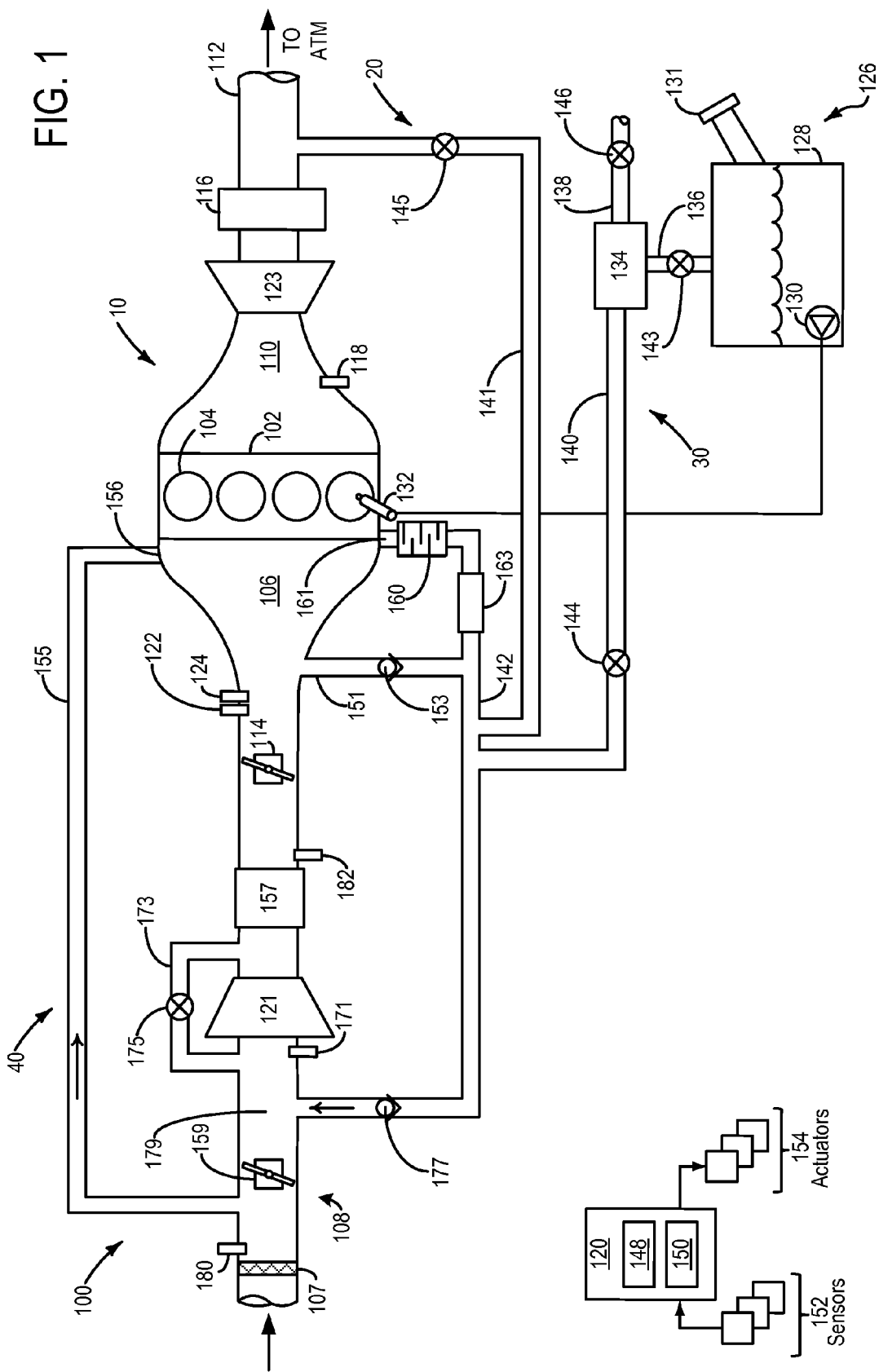
FIGS. 1-4 show example turbocharged engine systems in accordance with the disclosure.

FIG. 1 schematically shows an example of an engine system 100 according to an embodiment of the present disclosure. Engine system 100 may be included in a vehicle system in order to at least partially assist in propulsion of the vehicle system. For example, engine system 100 may be included in a suitable hybrid vehicle system, e.g., a hybrid electric vehicle (HEV), which includes additional vehicle propulsion systems, e.g., motors, or may be included in a non-HEV vehicle that does not include a motor and is merely powered by an internal combustion engine.

The engine system 100 includes an engine 10 with an engine block 102 having a plurality of cylinders 104. The cylinders 104 may receive intake air from an intake manifold 106 via an intake passage 108 and may exhaust combustion gases to an exhaust manifold 110 and further to the atmosphere via exhaust passage 112. The intake air received in the intake passage 108 may be cleaned upon passage through an intake air cleaner 107.

The engine may include at least one turbocharger including a compressor 121 and a turbine 123. Compressor 121 is coupled to intake passage 108 and is driven by turbine 123 coupled to exhaust passage 112. Compressor 121 compresses air in intake passage 108 for delivery to intake manifold 106. In some examples, engine system 100 may include a compressor bypass conduit 173 coupled to the intake 108 upstream and downstream of compressor 121. Compressor bypass conduit 173 may include a compressor bypass valve 175 configured to adjust an amount of air flow bypassing compressor 121. Further, intake 108 may include a charge air cooler (CAC) 157 in intake 108 downstream of compressor 121. Charge air cooler 157 may be configured to reduce a temperature of compressed air exiting compressor 121 before delivery to intake manifold 106. The intake passage 108 may include a compressor inlet pressure sensor 171 located upstream of compressor 121. Further, in some examples, an additional pressure sensor 182 may be located in intake passage 108 downstream of compressor 121.

An intake throttle 114 is positioned downstream of the compressor 121. The intake throttle 114 may be configured to alter the amount of air provided to the intake manifold 106. In this particular example, the position of the throttle 114 may be varied by a controller 120 via a signal provided to an electric motor or actuator included with the throttle 114, a configuration that is commonly referred to as electronic throttle control (ETC). In this manner, the throttle 114 may be operated to vary the intake air provided to the plurality of cylinders 104. The intake passage 108 may include a mass air flow sensor 122 and a manifold air pressure sensor 124 for providing respective signals MAF and MAP to the controller 120. The mass air flow sensor 122 and the manifold air pressure sensor 124 may be positioned in the intake passage 108 downstream of intake throttle 114, in some examples.

An emission control device 116 is shown arranged along the exhaust passage 112. In some examples, emission control device 116 may be located in exhaust passage 112 downstream of turbine 123. The emission control device 116 may be a three way catalyst (TWC), NOx trap, various other emission control devices, or combinations thereof. In some embodiments, during operation of the engine system 100, the emission control device 116 may be periodically reset by operating at least one cylinder of the engine within a particular air/fuel ratio. An exhaust gas sensor 118 is shown coupled to the exhaust passage 112 upstream of the emission control device 116. The sensor 118 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. It will be appreciated that the engine system 100 is shown in simplified form and may include other components.

A fuel injector 132 is shown coupled directly to the cylinder 104 for injecting fuel directly therein in proportion to a pulse width of a signal received from the controller 120. In this manner, the fuel injector 132 provides what is known as direct injection of fuel into the cylinder 104. The fuel injector may be mounted in the side of the combustion chamber or in the top of the combustion chamber, for example. Fuel may be delivered to the fuel injector 132 by a fuel system 126. In some embodiments, cylinder 104 may alternatively or additionally include a fuel injector arranged in intake manifold 106 in a configuration that provides what is known as port injection of fuel into the intake port upstream of the cylinder 104.

The fuel system 126 includes a fuel tank 128 coupled to a fuel pump system 130. A refueling pipe and fuel cap 131 are coupled to fuel tank 128 for replenishing fuel in the tank. The fuel pump system 130 may include one or more pumps for pressurizing fuel delivered to the injectors 132 of the engine system 100, such as the fuel injector 132. While only a single injector 132 is shown, additional injectors are provided for each cylinder. It will be appreciated that fuel system 126 may be a return-less fuel system, a return fuel system, or various other types of fuel system.

The engine system 100 may include a plurality of gas discharge sources wherein gas from the gas discharge source is directed to intake passage 108. For example, the engine system 100 may direct a variety of gas streams to an intake system of the engine 10 such as an evaporative emissions system 30, exhaust gas recirculation (EGR) system 20, and/or crankcase ventilation system 40. As described above, in approaches which rely on engine intake manifold vacuum to drive gas circulation through the aforementioned systems, the gas flow rate through such systems may disadvantageously vary based on the air flow rates in the intake passage 108. In order to provide a consistent flow rate through such systems under all engine operating conditions, a vacuum source 179 may be provided in intake passage 108 so that gas delivery rates from the crankcase ventilation system 40, emission control system 30, and EGR system 20 may be delivered in proportion to engine air flow rate during different engine operating conditions.

As shown in the example engine system of FIG. 1, intake passage 108 may include a pre-compressor throttle 159 located in intake passage 108 upstream of compressor 121. For example, by maintaining pre-compressor throttle 159 at a partially open position, an amount of vacuum may be generated at the vacuum source 179 located downstream of pre-compressor throttle 159 to draw gas flow through evaporative emissions system 30, exhaust gas recirculation (EGR) system 20, and/or crankcase ventilation system 40.

For example, crankcase ventilation system 40 includes a crankcase inlet conduit 155 coupled to intake passage 108 upstream of pre-compressor throttle 159 and an inlet 156 of a sealed crankcase of engine 10. Crankcase ventilation system 40 further includes a crankcase outlet conduit 142 coupled to an outlet 161 of the sealed crankcase of engine 10. A check valve 177 may be included in conduit 142 so that crankcase ventilation gases are driven by vacuum provided at vacuum source 179 uni-directionally through the crankcase ventilation system 40 in a direction from upstream of pre-compressor throttle 159 to the intake passage between the pre-compressor throttle 159 and the compressor 121. Crankcase ventilation system 40 may further include an oil separator 160 located in conduit 142 adjacent to outlet 161. Since the gas flow through the crankcase ventilation system is uni-directional, the crankcase ventilation system may only include a single oil separator 160.

In some examples, crankcase outlet conduit 142 may additionally be coupled, via conduit 151, to intake passage 108 at a location downstream of intake throttle 114 so that during certain conditions, vacuum from intake manifold 106 may be used in addition to vacuum generated at vacuum source 179, to pull crankcase gases through the crankcase ventilation system into intake manifold 106. Conduit 151 may additionally include a one-way check valve 153 to provide uni-directional flow through the crankcase ventilation system 40.

Further, in some examples, crankcase ventilation system 40 may include a flow limiting device 163 disposed in conduit 142. For example, flow limiting device 163 may be a sonic choke configured to restrict the amount of flow in the discharge outlet 161 of the crankcase ventilation system in response to an amount of flow in the crankcase ventilation system greater than a threshold amount.

The engine system may further include an emission control system 30 including a fuel vapor canister 134. Vapors generated in the fuel system 126 may be directed to an inlet of fuel vapor canister 134 via a vapor recovery line 136. The fuel vapor canister may be filled with an appropriate adsorbent to temporarily trap fuel vapors (including vaporized hydrocarbons) during fuel tank refilling operations and "running loss" (that is, fuel vaporized during vehicle operation). In one example, the adsorbent used is activated charcoal. However, other adsorbents have been contemplated.

In examples where engine system 100 is coupled in a hybrid vehicle system, the engine may have reduced operation times due to the vehicle being powered by engine system 100 during some conditions, and by a system energy storage device or motor under other conditions. While the reduced engine operation time reduces overall carbon emissions from the vehicle, it may also lead to a decrease in purging of fuel vapors from the vehicle's emission control system. To address this, a fuel tank isolation valve 143 may be optionally included in vapor recovery line 136 such that fuel tank 128 is coupled to canister 134 via the isolation valve 143. During regular engine operation, isolation valve 143 may be kept closed to limit the amount of diurnal or "running loss" vapors directed to canister 134 from fuel tank 128. During refueling operations, and selected purging conditions, isolation valve 143 may be temporarily opened, e.g., for a duration, to direct fuel vapors from the fuel tank 128 to canister 134. By opening the valve during conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 143 positioned along vapor recovery line 136, in alternate examples, the isolation valve may be mounted on fuel tank 128. The fuel vapor canister 134 may be fluidly coupled to a vent line 138 which includes a vent valve 146. Under some conditions, the vent line 138 may route gases out of the fuel vapor canister 134 to the atmosphere, such as when storing, or trapping, fuel vapors of the fuel system 126. The fuel vapor canister is coupled to intake passage 108 via a purge conduit 140 including a purge valve 144. For example, during a fuel vapor purging event, vacuum generated at vacuum source 179 may be used to purge the canister 134 so that fuel vapors stored in canister 134 are delivered to intake passage 108.

The vent line 138 may allow fresh air to be drawn into the fuel vapor canister 134 when purging stored fuel vapors of the fuel vapor canister to the intake manifold 106 via the purge line 140. In particular, the vent valve 146 may be opened so that fresh air may be drawn into the canister via vent line 138 and vacuum generated at vacuum source 179 may be used to draw fuel vapors from the canister 134 into intake passage 108. Purge valve 144 may be adjusted to control a purge flow rate delivered to engine 10. In some examples, the purge conduit 140 may be coupled to conduit 142 so that vacuum generated at vacuum source 179 may be provided to emission control system 30 in addition to crankcase ventilation system 40.

Engine system 100 may also include an exhaust gas recirculation (EGR) system 20. EGR system 20 includes an EGR conduit 141 in fluidic communication with the intake passage 108 and the exhaust manifold 110. EGR conduit 141 includes an EGR valve 145 configured to control an amount of exhaust gas flowing through conduit 141. Further, EGR conduit 141 may also be coupled to vacuum source 179 so that vacuum generated at vacuum source 179 may be used to drive gas through EGR system 20. For example, EGR conduit 141 may also be coupled to conduit 142 that vacuum generated at vacuum source 179 may be provided to EGR system 20 in addition to emission control system 30 and crankcase ventilation system 40. In some examples, the EGR conduit 141 may be coupled to exhaust conduit 112 downstream of turbine 123 and emission control device 116. However, in other examples, EGR conduit 141 may be coupled to exhaust passage 112 upstream of turbine 123 and/or upstream of emission control device 116. The EGR in conduit 141 may be cooled along its path.

The controller 120 is shown in FIG. 1 as a microcomputer, including microprocessor unit 148, input/output ports, a computer readable storage medium 150 for executable programs and calibration values (e.g., read only memory chip, random access memory, keep alive memory, etc.) and a data bus. Storage medium read-only memory 150 can be programmed with computer readable data representing instructions executable by the processor 148 for performing the methods described below as well as other variants that are anticipated but not specifically listed.

The controller 120 may receive information from a plurality of sensors 152 of the engine system 100 that correspond to measurements such as inducted mass air flow, engine coolant temperature, ambient temperature, engine speed, throttle position, manifold absolute pressure signal, compressor inlet pressure, intake volume pressure signal, an intake passage pressure signal, air/fuel ratio, fuel fraction of intake air, intake volume pressure, fuel tank pressure, fuel canister pressure, etc. Note that various combinations of sensors may be used to produce these and other measurements. The sensors 152 may include a pressure sensor 180 positioned upstream pre-compressor throttle 159, a pressure sensor 171 positioned upstream of compressor 121, a pressure sensor 182 positioned downstream of compressor 121, and the pressure sensor 124. Furthermore, the controller 120 may control a plurality of actuators 154 of the engine system 100 based on the signals from the plurality of sensors 152. Examples of actuators 154 may include the pre-compressor throttle 159, the intake throttle 114, the fuel injector 132, compressor bypass valve 175, EGR valve 145, and purge valve 144.

Figure 2:
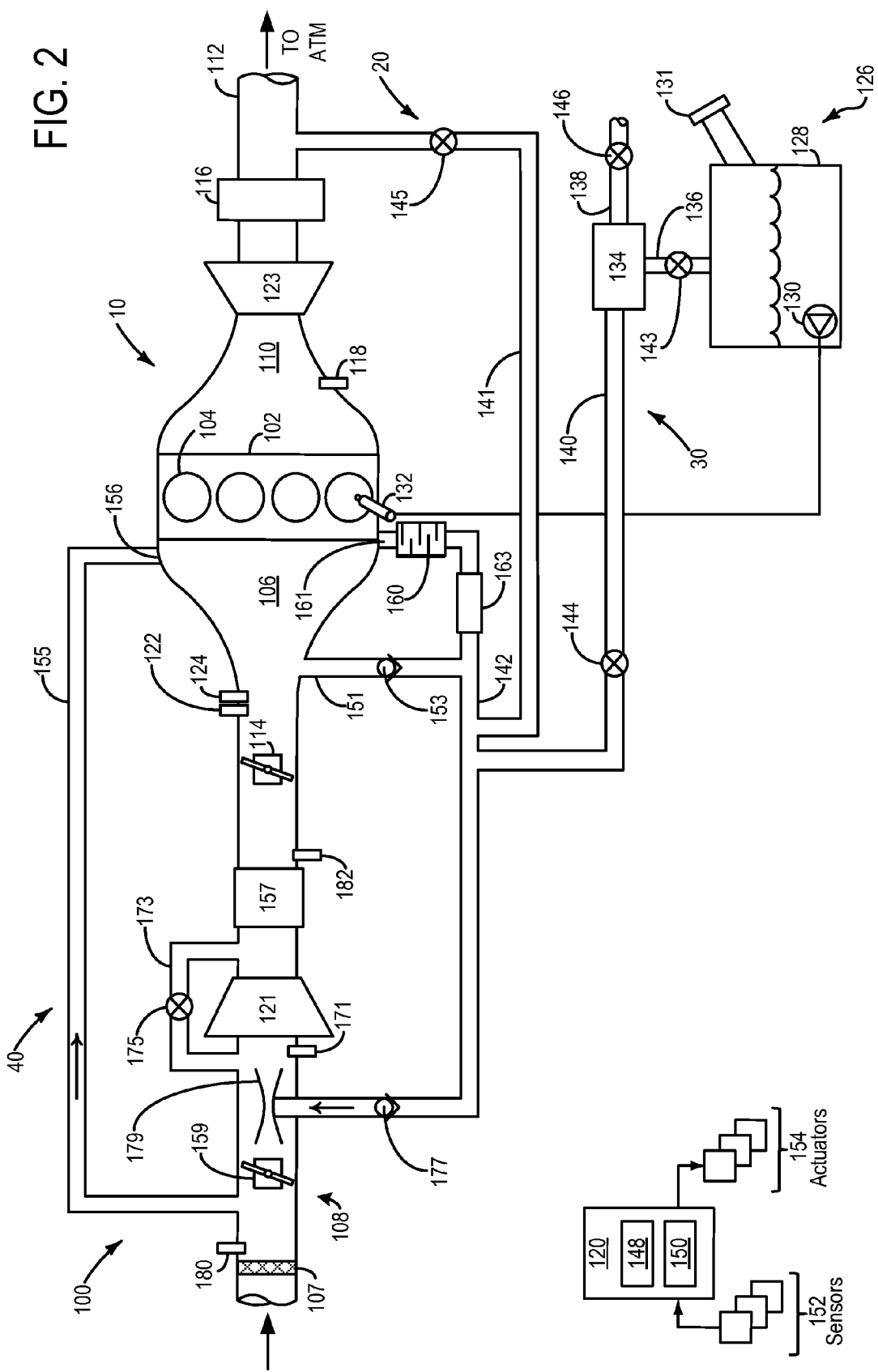

FIG. 2 show another example engine system 100 including a vacuum source 179 positioned within engine intake passage 108 and used to generate vacuum to assist in driving gas flow through the crankcase ventilation system 40, the emission control system 30, and the EGR system 20. Like numbers shown in FIG. 2 correspond to like-numbered elements shown in FIG. 1 described above.

In the example shown in FIG. 2, vacuum source 179 comprises an ejector or venturi located within intake passage 108 at a position between pre-compressor throttle 159 and compressor 121. In this example, the gas discharge sources are coupled to a low pressure region of ejector 179, e.g., via conduit 142. During engine operating conditions as air flows through intake passage 108 and through ejector 179, a vacuum is generated within the ejector where the vacuum generated is proportional the amount of air flowing through the ejector. Thus, for example, as air flow through intake passage 108 increases, the amount of vacuum generated by vacuum source 179 also increases. Thus, at high engine air speed conditions, e.g., when intake throttle 114 is opened an increased amount, vacuum available to the gas discharge sources may be advantageously increased. In this way, gas delivery rates from the crankcase ventilation system 40, emission control system 30, and EGR system 20 may be delivered in proportion to engine air flow rate during different engine operating conditions. For example, an amount of crankcase ventilation flow and an amount of fuel vapor purge flow may increase during high engine intake flow conditions when an increase in flow in such systems is desired.

Figure 3:
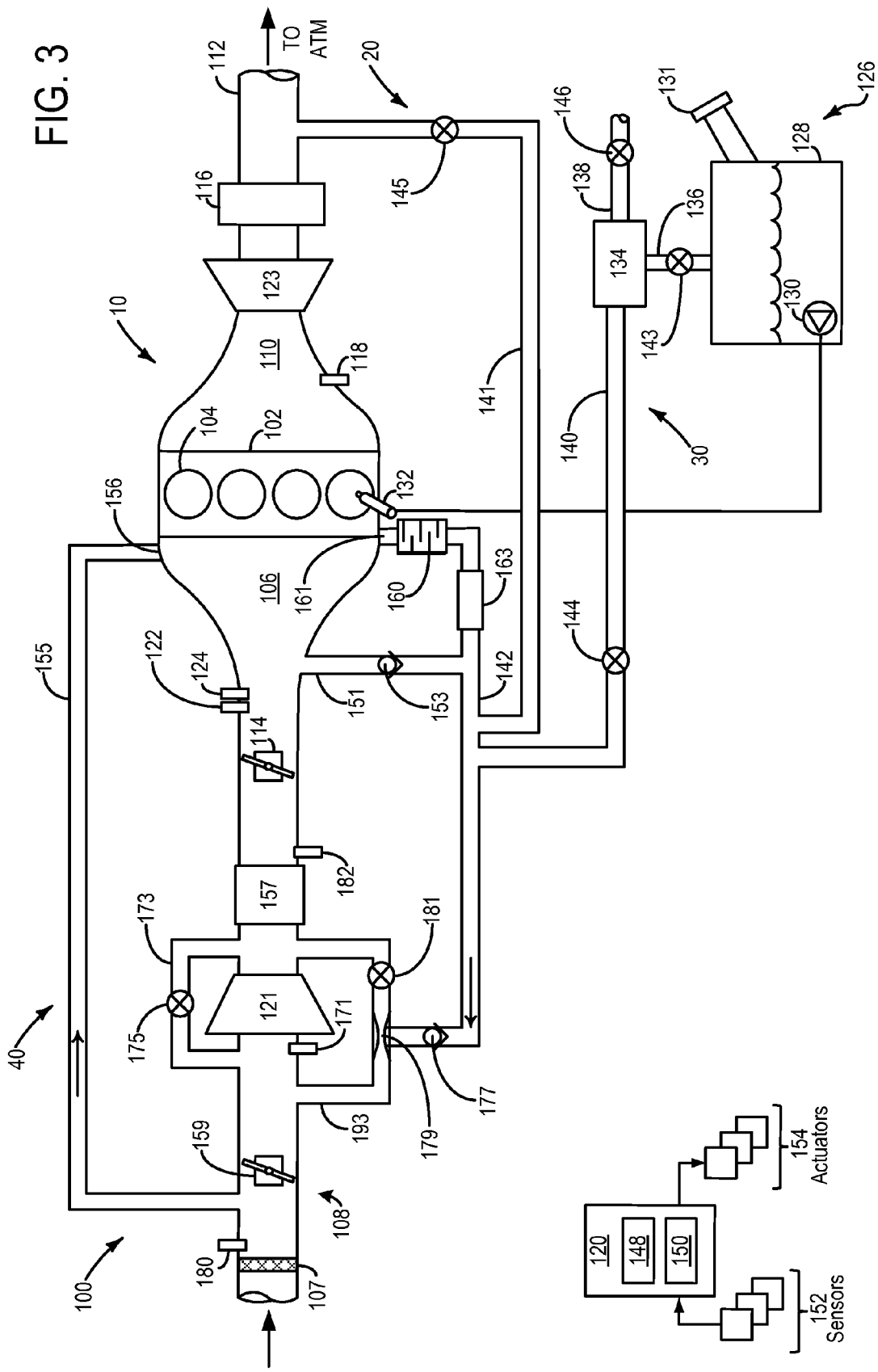

FIG. 3 show another example engine system 100 including a vacuum source 179 used to generate vacuum to assist in driving gas flow through the crankcase ventilation system 40, the emission control system 30, and the EGR system 20. Like numbers shown in FIG. 3 correspond to like-numbered elements shown in FIG. 1 described above.

In the example shown in FIG. 3, vacuum source 179 comprises an ejector or venturi located within a compressor bypass passage 193 coupled to intake passage 108 upstream and downstream of compressor 121. In this example, bypass passage 193 may include a valve 181 for controlling an amount of air flow through passage 193. The vacuum source 179 comprises an ejector disposed within bypass passage 193 and may be positioned upstream of valve 181 (as shown) or downstream of valve 181. In this example, the gas discharge sources are coupled to a low pressure region of ejector 179, e.g., via conduit 142. In some examples, bypass conduit 193 may be the same as compressor bypass conduit 173. However, in other examples, bypass passage 193 including vacuum source 179 may be an additional bypass passage different from bypass conduit 173.

As remarked above, valve 181 may be configured to control an amount of air flow through ejector 179. For example, during engine operating conditions when an amount of vacuum in intake manifold 106 is sufficient to drive gas flow through the crankcase ventilation system 40, the emission control system 30, and the EGR system 20, e.g., when an air flow rate in the intake passage is less than a threshold amount, then valve 181 may be closed or adjusted to decrease flow through ejector 179. However, during engine operating conditions when an amount of vacuum in intake manifold 106 is not sufficient to drive gas flow through the crankcase ventilation system 40, the emission control system 30, and the EGR system 20, e.g., when an air flow rate in the intake passage is greater than a threshold amount and/or when an opening amount of intake throttle 114 is greater than a threshold amount, then an opening amount of valve 181 may be increased to increase an amount of air flowing through ejector 179 so that an increased vacuum is available to the crankcase ventilation system 40, the emission control system 30, and the EGR system 20.

Figure 4:
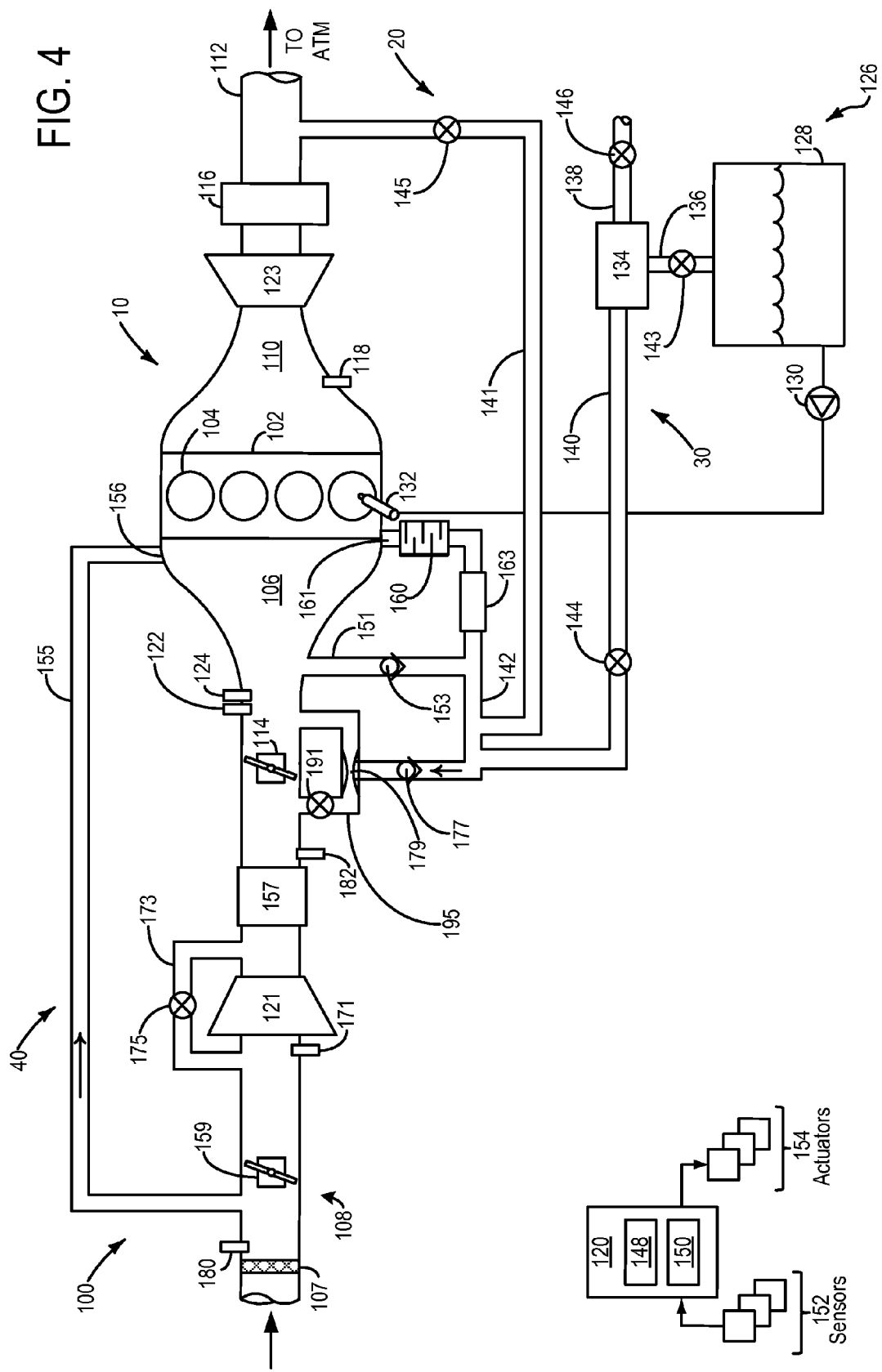
Figure 5:
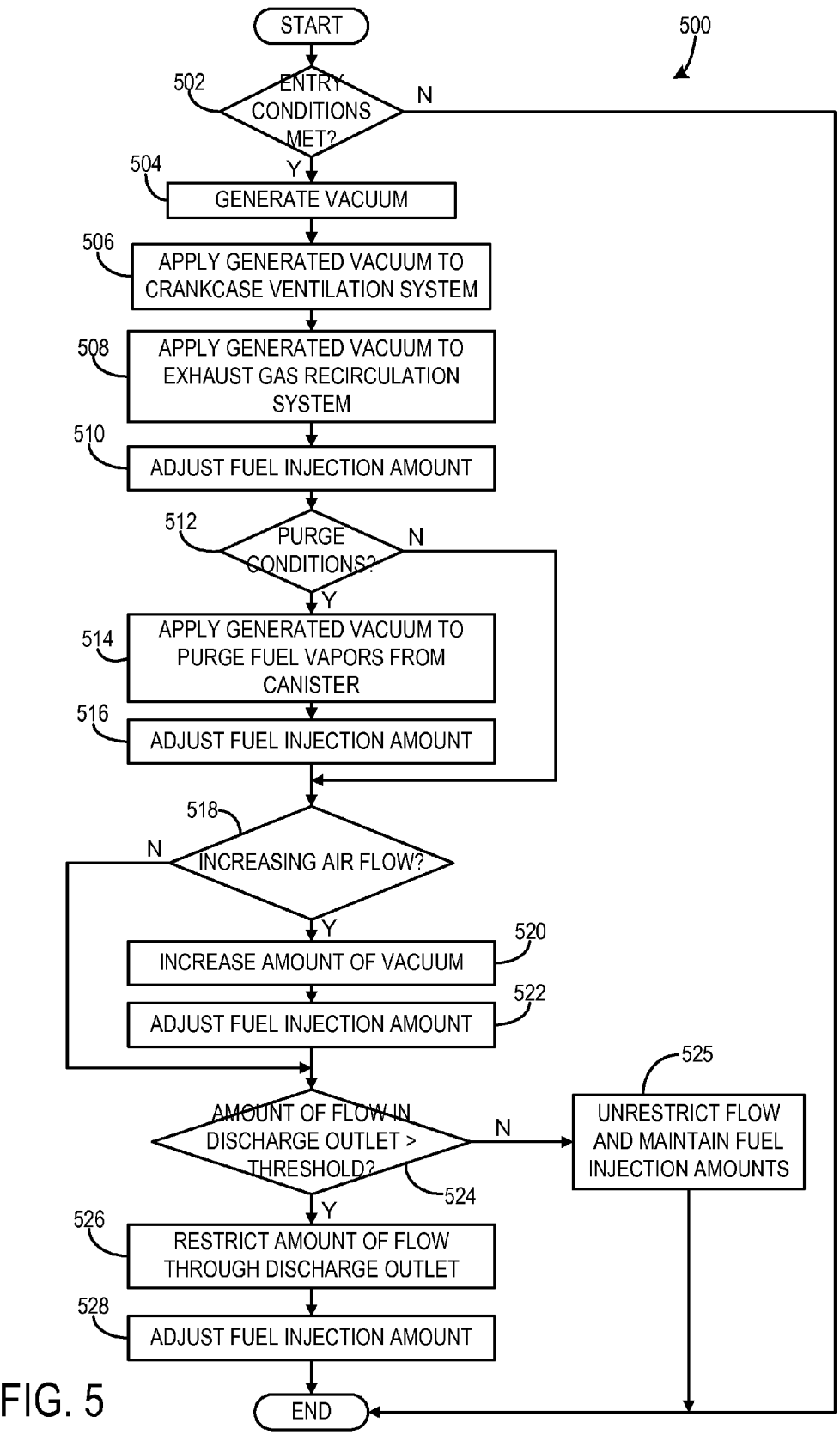
FIG. 5 shows an example method for operating a turbocharged engine in accordance with the disclosure.

FIG. 4 shows yet another example engine system 100 including a vacuum source 179 used to generate vacuum to assist in driving gas flow through the crankcase ventilation system 40, the emission control system 30, and the EGR system 20. Like numbers shown in FIG. 4 correspond to like-numbered elements shown in FIG. 1 described above.

In the example shown in FIG. 4, vacuum source 179 comprises an ejector or venturi located within a throttle bypass passage 195 coupled to intake passage 108 upstream and downstream of intake throttle 114. In this example, bypass passage 195 may include a valve 191 for controlling an amount of air flow through passage 195. The vacuum source 179 comprises an ejector disposed within throttle bypass passage 195 and may be positioned upstream of valve 191 or downstream of valve 191 (as shown). In this example, the gas discharge sources are coupled to a low pressure region of ejector 179, e.g., via conduit 142.

As remarked above, valve 191 may be configured to control an amount of air flow through ejector 179. For example, during engine operating conditions when an amount of vacuum in intake manifold 106 is sufficient to drive gas flow through the crankcase ventilation system 40, the emission control system 30, and the EGR system 20, e.g., when an air flow rate in the intake passage is less than a threshold amount, then valve 191 may be closed or adjusted to decrease flow through ejector 179. However, during engine operating conditions when an amount of vacuum in intake manifold 106 is not sufficient to drive gas flow through the crankcase ventilation system 40, the emission control system 30, and the EGR system 20, e.g., when an air flow rate in the intake passage is greater than a threshold amount and/or when an opening amount of intake throttle 114 is greater than a threshold amount, then an opening amount of valve 191 may be increased to increase an amount of air flowing through ejector 179 so that an increased vacuum is available to the crankcase ventilation system 40, the emission control system 30, and the EGR system 20.

FIG. 5 shows an example method 500 for operating a turbocharged engine to provide vacuum to drive flow through one or more of a crankcase ventilation system, an emission control system, and an exhaust gas recirculation (EGR) system included in an engine system. As shown in FIGS. 1-4 described above, an engine system may include a vacuum source 179 used to provide consistent vacuum throughout engine operation to one or more of a crankcase ventilation system, an emission control system, and an exhaust gas recirculation (EGR) system.

At 502, method 500 includes determining if entry conditions are met. Entry conditions may include an engine in operation and boosted engine operating conditions, for example. If entry conditions are met at 502, method 500 proceeds to 504. At 504, method 500 includes generating vacuum. For example, a vacuum source, such as vacuum source 170 shown in FIGS. 1-4, may be used to generate vacuum so that vacuum may be drawn from the vacuum source located in the intake of the engine at a position downstream of a pre-compressor throttle and upstream of an intake throttle. As one example, the vacuum source may comprise an ejector disposed in the intake of the engine between the pre-compressor throttle and a compressor inlet, e.g., as shown in FIG. 2. As another example, the vacuum source may comprise an ejector disposed in a compressor bypass conduit, e.g., as shown in FIG. 3. As another example, the vacuum source may comprise an ejector disposed in an intake throttle bypass conduit, e.g., as shown in FIG. 4. As still another example, the vacuum source may be located downstream of a pre-compressor throttle adjusted to a partially closed position, e.g., as shown in FIG. 1.

At 506, method 500 includes applying the generated vacuum to a crankcase ventilation system. For example, the vacuum generated at vacuum source 179 may be drawn, e.g., via conduit 142, and applied to a discharge outlet of a unidirectional crankcase ventilation system, where an inlet of the crankcase ventilation system is coupled to the intake of the engine at a position upstream of the pre-compressor throttle.

At 508, method 500 may include applying the generated vacuum to an exhaust gas recirculation system. For example, the vacuum generated at vacuum source 179 may be drawn, e.g., via conduit 142, and applied to an exhaust gas recirculation conduit to draw engine exhaust gas into an intake manifold of the engine while continuing to apply the drawn vacuum to the discharge outlet of the crankcase ventilation system.

At 510, method 500 includes adjusting a fuel injection amount. For example, a fuel injection amount in the engine may be adjusted based on an amount of fuel discharged from the discharge outlet of the crankcase ventilation system and/or the EGR system. For example, an amount of fuel injected in the engine may be decreased in response to an increased amount of fuel delivered to the engine intake from the crankcase ventilation system and/or the EGR system.

At 512, method 500 includes determining if fuel vapor purging conditions are present. For example, fuel vapor purging conditions may be based on an amount of fuel vapor stored in the fuel vapor canister greater than a threshold amount. If fuel vapor purging conditions are not present at 512, then method 500 proceeds to 518 described below. However, if purging conditions are present at 512, method 500 proceeds to 514. At 514, method 500 includes applying generated vacuum to purge fuel vapors from a fuel vapor canister. For example, in response to a fuel vapor purging event, vacuum generated at the vacuum source 179 may be drawn, e.g., via conduit 142, and applied to the emission control system 30 to purge fuel vapors from the fuel vapor canister to an intake manifold of the engine while continuing to apply the drawn vacuum to the discharge outlet of the crankcase ventilation system. At 516, method 500 includes again adjusting the fuel injection amount. For example, a fuel injection amount in the engine may be adjusted based on an amount of fuel discharged from the emission control system during the fuel vapor purging event. For example, an amount of fuel injected in the engine may be decreased in response to an increased amount of fuel delivered to the engine intake from the fuel vapor canister.

At 518, method 500 includes determining if increasing engine intake air flow conditions are present. For example, increasing engine intake air flow conditions may be determined based on a position of intake throttle 114 or may be based on an increase in engine speed and/or load. If increasing engine intake air flow conditions are not present at 518, method 500 proceeds to 524 described below. However, if increasing engine intake air flow conditions are present at 518, method 500 proceeds to 520.

At 520, method 500 includes increasing an amount of vacuum. For example, the amount of drawn vacuum from the vacuum source may be increased in response to increasing an amount of flow through the engine intake and/or in response to increasing an opening amount of the intake throttle. For example, as the amount of air flow through the engine intake increases, the amount of vacuum generated by the vacuum source 179 may also increase. As another example, when the vacuum source is included in a compressor bypass conduit, e.g., bypass conduit 193 shown in FIG. 3, an opening amount of a valve in the bypass conduit, e.g., valve 181, may be increased in response to an increase in an amount of air flowing in the engine intake. As still another example, when the vacuum source is included in a throttle bypass conduit, e.g., bypass conduit 195 shown in FIG. 4, an opening amount of a valve in the bypass conduit, e.g., valve 191, may be increased in response to an increase in an amount of air flowing in the engine intake.

At 522, method 500 includes adjusting the fuel injection amount. For example, a fuel injection amount in the engine may be adjusted based on an amount of fuel delivered to the engine from one or more of the emission control system, the crankcase ventilation system, and the EGR system. For example, an amount of fuel injected in the engine may be decreased in response to an increased amount of fuel delivered to the engine intake from the crankcase ventilation system and/or the EGR system, and/or the emission control system.

At 524, method 500 includes determining if an amount of flow in a gas discharge outlet is greater than a threshold. For example, an amount of flow in the emission control system, the crankcase ventilation system, and the EGR system may be determined and compared to a threshold amount of flow. If an amount of flow in a gas discharge outlet is not greater than the threshold at 524, method 500 proceeds to 525 to unrestrict flow in the discharge outlet and maintain fuel injection amounts. However, if an amount of flow in a gas discharge outlet is greater than the threshold at 524, method 500 proceeds to 526. At 526, method 500 includes restricting an amount of flow through the discharge outlet. For example, in response to an amount of flow in the discharge outlet of the uni-directional crankcase ventilation system greater than a threshold, the amount of flow in the discharge outlet may be restricted, e.g., via flow limiting device 163, to an amount below the threshold. As another example, purge valve 144 may be adjusted to restrict the amount of flow in purge conduit 140. As still another example, EGR valve 145 may be adjusted to restrict the amount of flow in EGR conduit 141.

At 528, method 500 includes adjusting the fuel injection amount. For example, a fuel injection amount in the engine may be further adjusted based on an amount of fuel delivered to the engine from one or more of the emission control system, the crankcase ventilation system, and the EGR system. For example, an amount of fuel injected in the engine may be decreased in response to an increased amount of fuel delivered to the engine intake from the crankcase ventilation system and/or the EGR system, and/or the emission control system.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method for a turbocharged engine, comprising:
    drawing vacuum from a vacuum source located in an intake of the engine downstream of a pre-compressor throttle and upstream of an intake throttle;
    applying the drawn vacuum to a discharge outlet of a uni-directional crankcase ventilation system, where an inlet of the crankcase ventilation system is coupled to the intake of the engine upstream of the pre-compressor throttle; and
    when an air flow rate in an intake passage is greater than a threshold amount and when an opening amount of the intake throttle is greater than a threshold amount, increasing an opening amount of a valve in a bypass conduit.

2. The method of claim 1, further comprising, in response to a fuel vapor purging event, applying the drawn vacuum to purge fuel vapors from a fuel vapor canister to an intake manifold of the engine while continuing to apply the drawn vacuum to the discharge outlet, wherein the intake comprises a compressor between the pre-compressor throttle and the intake throttle.

3. The method of claim 2, further comprising applying the drawn vacuum to an exhaust gas recirculation conduit to draw engine exhaust gas into an intake manifold of the engine while continuing to apply the drawn vacuum to the discharge outlet, wherein intake air flows in past the pre-compressor throttle, then through the compressor, and then through the intake throttle, and then to the engine intake, and then to the intake manifold of the engine.

4. The method of claim 1, wherein the vacuum source comprises an ejector disposed in the intake of the engine between the pre-compressor throttle and a compressor inlet.

5. The method of claim 1, wherein the vacuum source comprises an ejector disposed in a compressor bypass conduit.

6. The method of claim 1, further comprising increasing an amount of drawn vacuum from the vacuum source in response to increasing an amount of flow through the engine intake.

7. The method of claim 1, further comprising increasing an amount of drawn vacuum from the vacuum source in response to increasing an opening amount of the intake throttle.

8. The method of claim 1, further comprising, in response to an amount of flow in the discharge outlet of the unidirectional crankcase ventilation system greater than a threshold, restricting the amount of flow in the discharge outlet to an amount below the threshold.

9. The method of claim 1, further comprising adjusting a fuel injection amount in the engine based on an amount of fuel discharged from the discharge outlet.

10. A method for a turbocharged engine, comprising:
   generating vacuum via an ejector in an intake of the engine downstream of a pre-compressor throttle and upstream of an intake throttle;
   applying the generated vacuum to a crankcase ventilation system to drive gases through the crankcase ventilation system from upstream the pre-compressor throttle to the intake at the ejector; and
   when an air flow rate in an intake passage is greater than a threshold amount and when an opening amount of the intake throttle is greater than a threshold amount, increasing an opening amount of a valve in a bypass conduit.

11. The method of claim 10, further comprising, in response to a fuel vapor purging event, applying the generated vacuum to purge fuel vapors from a fuel vapor canister to an intake manifold of the engine.

12. The method of claim 10, further comprising applying the generated vacuum to an exhaust gas recirculation conduit to draw engine exhaust gas from downstream an emission control catalyst into an intake manifold of the engine.

13. The method of claim 10, wherein the ejector is located in a compressor bypass conduit.

14. The method of claim 10, further comprising increasing an amount of vacuum generated via the ejector in response to increasing an amount of flow through the engine intake.

15. A method for a turbocharged engine, comprising:
   generating vacuum via an ejector in an intake of the engine downstream of a pre-compressor throttle and parallel to an intake throttle;
   applying the generated vacuum to a crankcase ventilation system to drive gases through the crankcase ventilation system from upstream the pre-compressor throttle to the intake at the ejector;
   applying the generated vacuum to an exhaust gas recirculation conduit to draw engine exhaust gas from downstream an emission control catalyst into an intake manifold of the engine;
   in response to a fuel vapor purging event, applying the generated vacuum to purge fuel vapors from a fuel vapor canister to the intake manifold of the engine; and
   when an air flow rate in an intake passage is greater than a threshold amount and when an opening amount of the intake throttle is greater than a threshold amount, increasing an opening amount of a valve in a bypass conduit.

16. The method of claim 15, wherein the ejector is located in an intake throttle bypass conduit.

17. The method of claim 15, further comprising increasing an amount of vacuum generated via the ejector in response to increasing an amount of flow through the engine intake.

* * * * *